(12) United States Patent
Tanner et al.

(10) Patent No.: US 7,686,251 B2
(45) Date of Patent: Mar. 30, 2010

(54) RIB SUPPORT FOR WING PANELS

(75) Inventors: Richard B. Tanner, Seattle, WA (US);
Ian C. Burford, Duvall, WA (US);
Thomas V. Gendzwill, Kirkland, WA (US); Gregory B. Doty, Edmonds, WA (US); James R. Huck, Woodinville, WA (US); Dean E. Wilson, Everett, WA (US); Brian H. Korenaga, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 191 days.

(21) Appl. No.: 11/867,158

(22) Filed: Oct. 4, 2007

(65) Prior Publication Data

US 2008/0173757 A1 Jul. 24, 2008

Related U.S. Application Data

(63) Continuation-in-part of application No. 11/610,444, filed on Dec. 13, 2006.

(51) Int. Cl.
*B64C 1/12* (2006.01)
(52) U.S. Cl. .................................... 244/132; 244/123.1
(58) Field of Classification Search .................. 244/132, 244/123.1, 123.7, 123.8, 131, 119
See application file for complete search history.

(56) References Cited

U.S. PATENT DOCUMENTS

| | | | |
|---|---|---|---|
| 2,367,750 A | 1/1945 | Berkow et al. | |
| 4,310,132 A | 1/1982 | Robinson et al. | |
| 5,944,286 A * | 8/1999 | Morris et al. | 244/132 |
| 6,386,481 B1 | 5/2002 | Kallinen | |
| 6,730,184 B2 * | 5/2004 | Kondo et al. | 156/221 |
| 6,739,553 B2 * | 5/2004 | Nunn et al. | 244/123.7 |
| 6,766,984 B1 | 7/2004 | Ochoa | |
| 2001/0051251 A1 * | 12/2001 | Noda et al. | 428/119 |
| 2006/0226287 A1 | 10/2006 | Grantham et al. | |
| 2006/0231682 A1 | 10/2006 | Sarh | |
| 2007/0102839 A1 | 5/2007 | McGowan et al. | |

* cited by examiner

*Primary Examiner*—Tien Dinh
*Assistant Examiner*—Richard R Green
(74) *Attorney, Agent, or Firm*—Yee & Associates, P.C.; Brett L. Halperin

(57) ABSTRACT

A method and apparatus for an aircraft structure. In one advantageous embodiment, the aircraft structure may have a rib, a plurality of stringers, and a set of shear ties. The plurality of stringers may have skin flanges at ends of the plurality of stringers capable of being fastened to skin for the aircraft structure. The set of shear ties may extend from the rib and have a set of elongate members in which the set of elongate members are attached to the plurality of stringers.

14 Claims, 7 Drawing Sheets

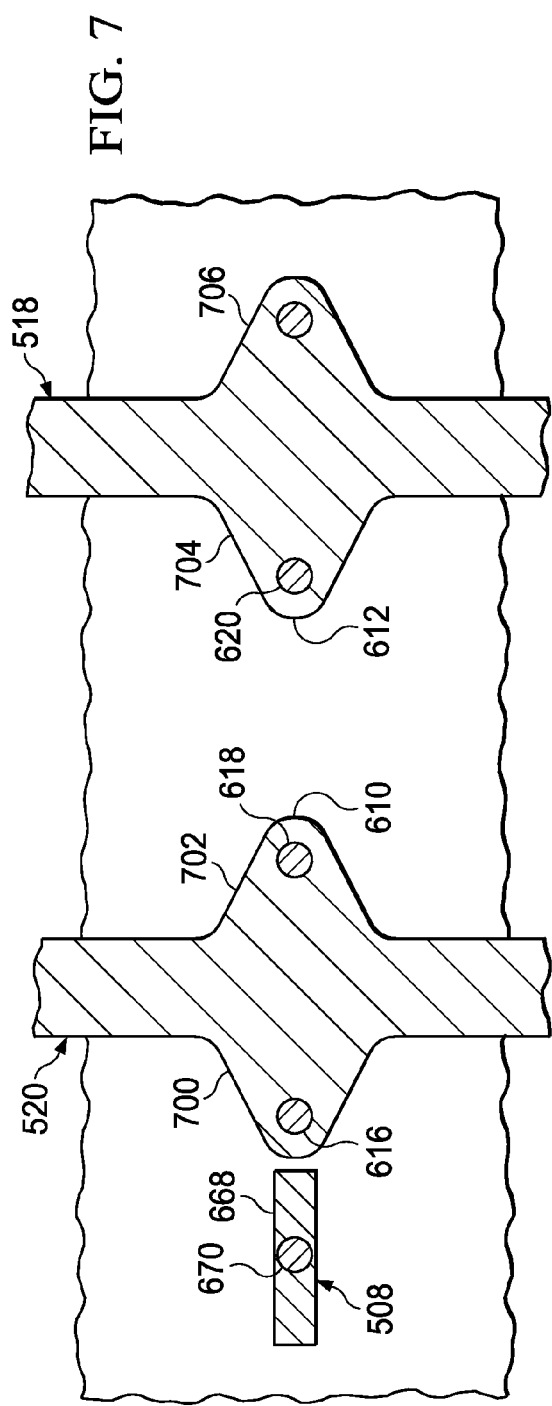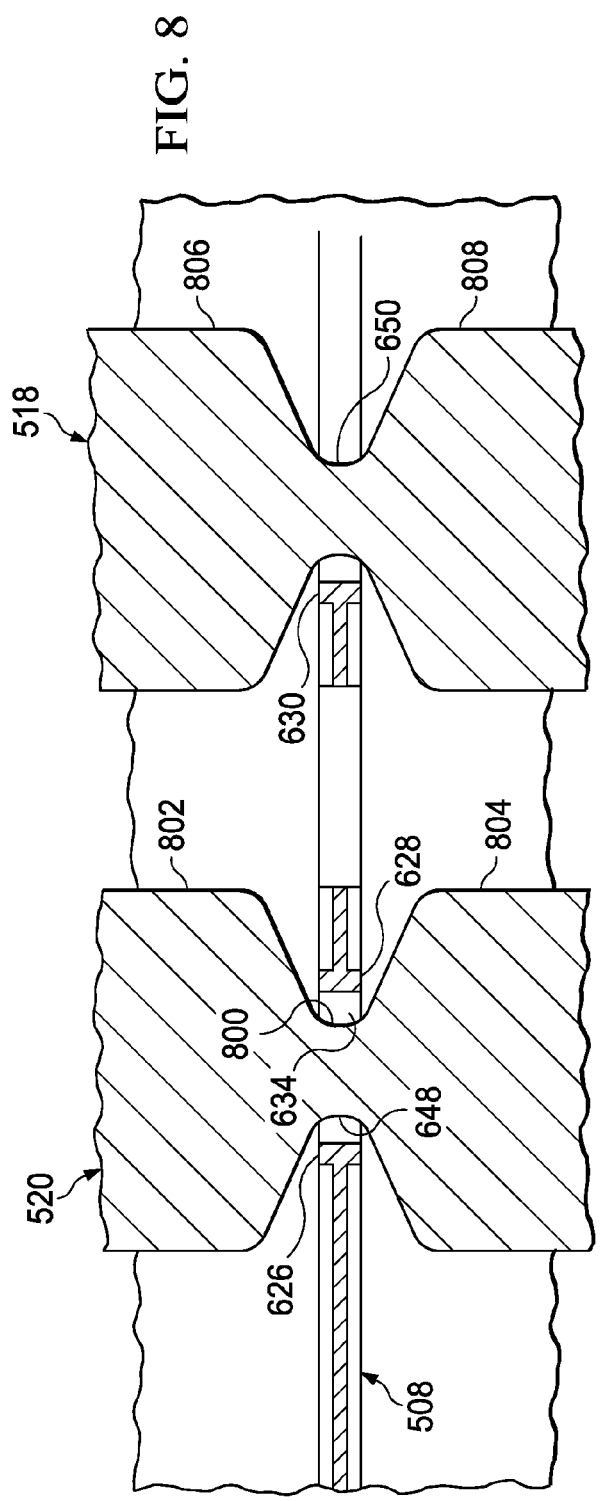

US 7,686,251 B2

RIB SUPPORT FOR WING PANELS

CLAIM OF PRIORITY

This application is a continuation-in-part of patent application U.S. Ser. No. 11/610,444, filed Dec. 13, 2006, entitled "Rib Support for Wing Panels", which is incorporated herein by reference.

BACKGROUND INFORMATION

1. Field

The present disclosure relates generally to aircraft and in particular to a method and apparatus for aircraft structural systems. Still more particularly, the present disclosure relates to a method and apparatus for a rib structure and attachment system for composite wing panels.

2. Background

In aircraft structures, wing panels, which consist of skins and stringers, may react to wing bending loads. These loads and the resulting deflections may produce upper wing compression buckling and a crushing load on ribs supporting the wing panels. The compression buckling capability for the panel may be driven by geometry, rib spacing and stringer spacing. The boundary conditions for the panel are determined by the method of support the rib gives the skin/stringer.

Traditional aluminum panel design as shown in FIG. 1 may provide panel support by attaching rib 10 to stringers 12 by means of a series of rib bolts 14 between free flange 16 of stringers 12 and associated rib chord flange 18. Skins 20 may be attached to the stringer outer flanges 22 using fasteners. An alternative method may be to attach a butterfly clip between the stringer web and the rib chord (not shown). These attachments may provide column stability for the panel and may not let the stringer roll over. These designs may be undesirable because they require installation while the wing box is being built. Drilling holes inside an enclosed wing box may present many challenges.

Further, application of this rib bolt design to a composite wing structure may create interlaminar tension problems in the stringer radius. This configuration may provide a poor load path for composite structure, which may require reinforcement methods for the stringer radius, adding more cost. The composite wing also may need disbond arrestment fasteners common to the stringer and skin in addition to the rib to stringer attachment.

It is therefore desirable to provide structural elements that provide an improved load path for rib support of wing panels. It is further desirable that the structure not require drilling of holes inside an enclosed wing box.

SUMMARY

The different advantageous embodiments provide a method and apparatus for an aircraft structure. In one advantageous embodiment, the aircraft structure may have a rib, a plurality of stringers, and a set of shear ties. The plurality of stringers may have skin flanges at ends of the plurality of stringers capable of being fastened to skin for the aircraft structure. The set of shear ties may extend from the rib and have a set of elongate members in which the set of elongate members are attached to a plurality of stringers.

In another advantageous embodiment, a method may be used for manufacturing an aircraft structure. A plurality of ribs having shear ties extending from the plurality of ribs may be provided. A plurality of stringers with skin flanges may be attached to the shear ties for the aircraft structure.

In yet another advantageous embodiment, an aircraft structure comprises a plurality of ribs, a skin panel, and a structural means for attaching the skin panel to the plurality of ribs. The structural means provides a load path from the skin panel to the plurality of ribs.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 7 is an illustration of a cross-sectional plan view of a stringer and rib structure configuration at the elevation of stringer skin flanges in accordance with an advantageous embodiment;

FIG. 8 is an illustration of a sectional view of a stringer and rib structure at a stringer through flange in accordance with an advantageous embodiment;

DETAILED DESCRIPTION

Figure 2:
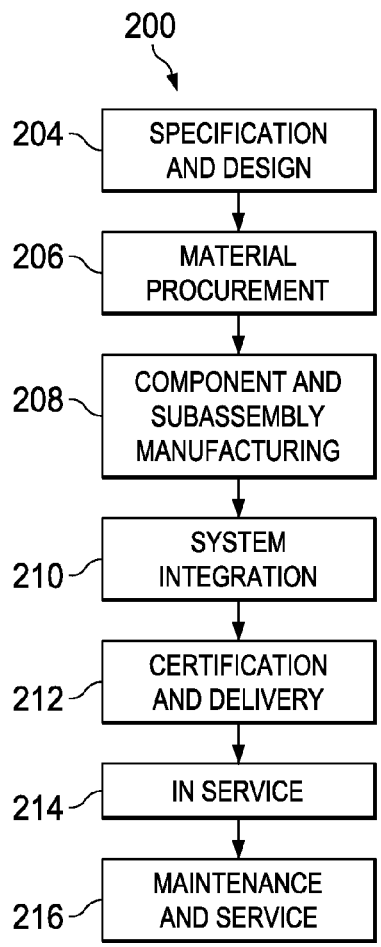
FIG. 2 is a flow diagram of aircraft production and service methodology in accordance with an advantageous embodiment.
Figure 3:
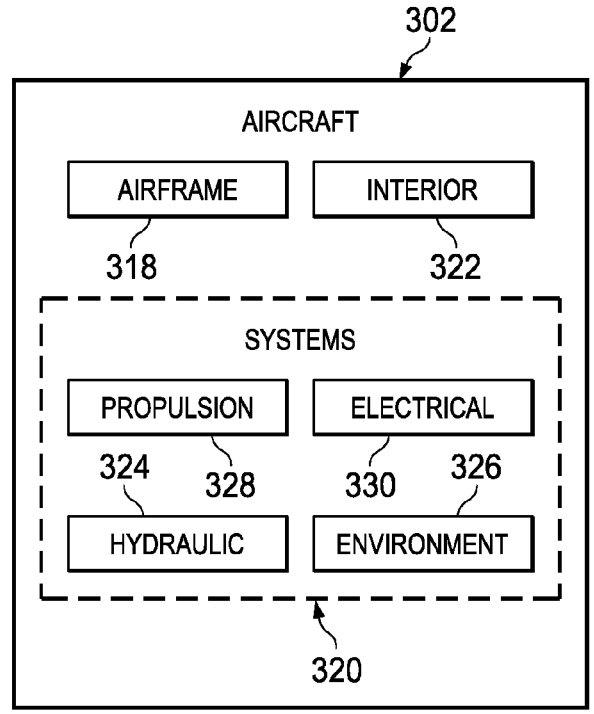
FIG. 3 is a block diagram of an aircraft in accordance with an advantageous embodiment.

Referring more particularly to the drawings, embodiments of the disclosure may be described in the context of an aircraft manufacturing and service method 200 as shown in FIG. 2 and an aircraft 302 as shown in FIG. 3. During pre-production, exemplary method 200 may include specification and design 204 of the aircraft 302 and material procurement 206. During production, component and subassembly manufacturing 208 and system integration 210 of the aircraft 302 takes place. Thereafter, the aircraft 302 may go through certification and delivery 212 in order to be placed in service 214. While in service by a customer, the aircraft 302 is scheduled for routine maintenance and service 216 (which may also include modification, reconfiguration, refurbishment, and so on).

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 3, aircraft 302 produced by exemplary method 200 in FIG. 2 may include an airframe 318 with a plurality of systems 320 and an interior 322. Examples of high-level systems 320 include one or more of a propulsion system 324, an electrical system 330, a hydraulic system 328, and an environmental system 326. Any number of other systems may be included. Although an aerospace example is shown, the principles of the disclosure may be applied to other industries, such as the automotive industry.

Apparatus and methods embodied herein may be employed during any one or more of the stages of the production and service method 200 in FIG. 2. For example, components or subassemblies corresponding to production process 208 in FIG. 2 may be fabricated or manufactured in a manner similar to components or subassemblies produced while the aircraft 302 is in service. Also, one or more apparatus embodiments, method embodiments, or a combination thereof may be utilized during the production stages 208 and 210 in FIG. 2, for example, by substantially expediting assembly of or reducing the cost of an aircraft 302. Similarly, one or more of apparatus embodiments, method embodiments, or a combination thereof may be utilized while the aircraft 302 is in service, for example and without limitation, to maintenance and service 216 in FIG. 2. In the different advantageous embodiments, a method and apparatus may be employed to manufacture structural components for aircraft wings in airframe 318.

Figure 4:
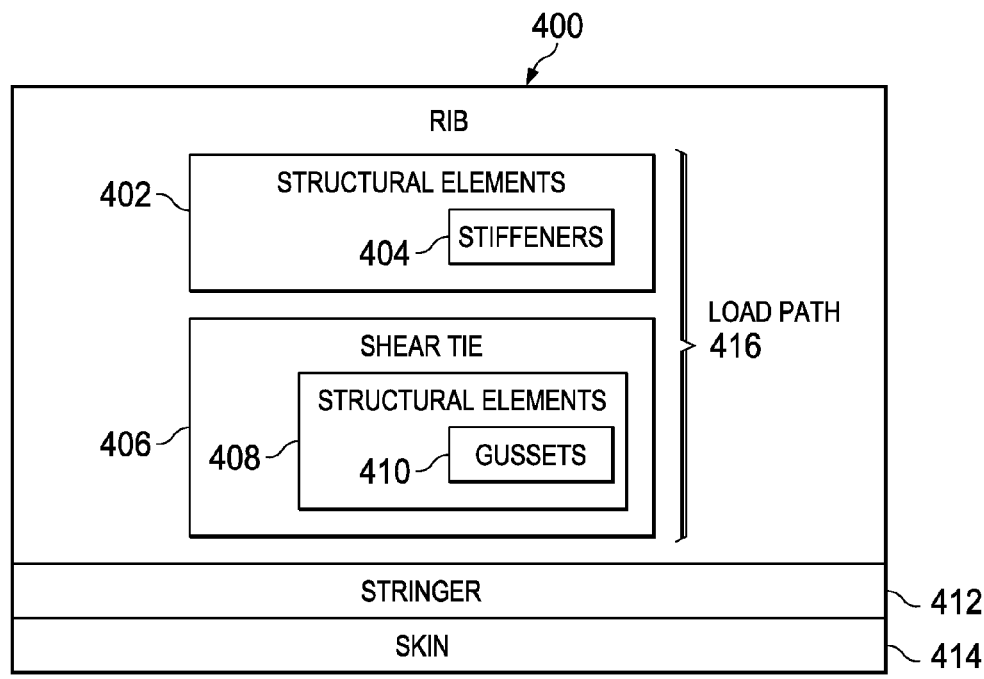
FIG. 4 is an illustration of components used to provide rib support for wing panels in accordance with an advantageous embodiment.

Turning next to FIG. 4, an illustration of components used to provide rib support for wing panels is depicted in accordance with an advantageous embodiment. In the depicted examples, a wing is shown in which different advantageous embodiments may be implemented. Other advantageous embodiments may be implemented in other structures, such as, for example, without limitation, stabilizers, control surfaces, fuselages, and doors.

In this example, rib 400 includes structural elements 402. These structural elements may include, for example, without limitation, stiffeners 404. Additionally, rib 400 also may include shear tie 406. In these examples, shear tie 406 may include structural elements 408. These structural elements may include, for example, without limitation, gussets 410. Shear tie 406 may be integral to rib 400. In these examples, shear tie 406 may be attached to stringer 412 and skin 414 through structural elements 408, such as gussets 410. In this manner, a load path, such as, for example, without limitation, load path 416, may be formed from rib 400 to stringer 412 and skin 414 through structural elements 408.

This type of architecture may be in contrast to currently used configuration in which stringer 412 may be directly connected to rib 400. With the current configuration, stringer 412 is part of load path 416.

As a result, the different advantageous embodiments provide load path 416, in which shear tie 406 connects directly to stringer 412 and skin 414. In this manner, issues, such as when forces are applied to a stringer radius in a stringer may be avoided with the configurations provided by the different advantageous embodiments. As a result, the typical "I" section stringer may be stable under compression and may not require mechanical structures or methods to keep stringer 412 from rolling over. The different embodiments may be applied to stringers having other configurations, such as, for example, without limitation, J, T, Z, and hat configurations.

Figure 5:
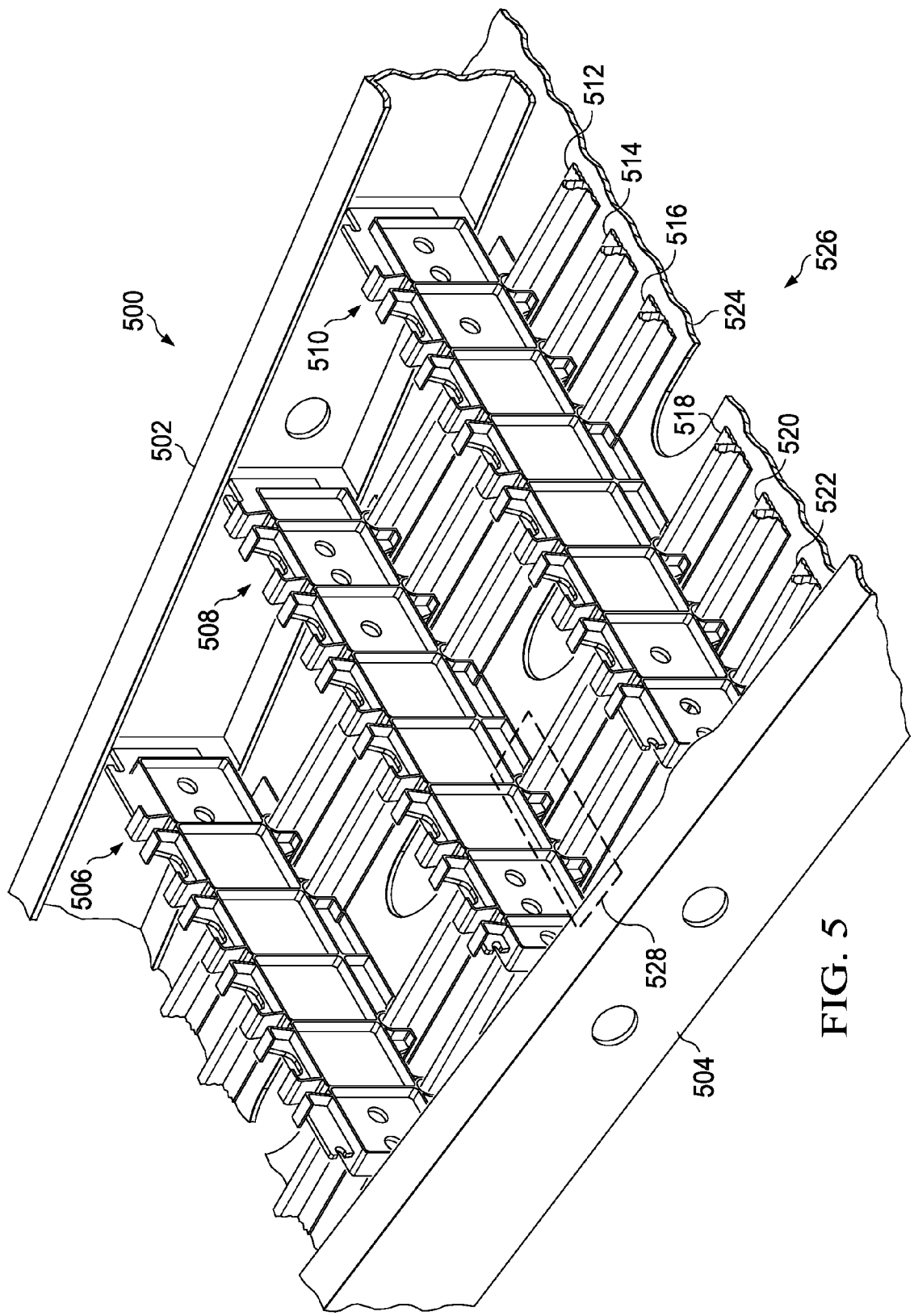
FIG. 5 is an illustration of a portion of a wing for an aircraft in accordance with an advantageous embodiment.

With reference now to FIG. 5, an illustration of a portion of a wing for aircraft 302 in FIG. 3 is depicted in accordance with an advantageous embodiment. In this example, wing 500 includes front spar 502, rear spar 504, rib 506, rib 508, and rib 510. Stringers 512, 514, 516, 518, 520, and 522, along with skin 524, form skin panel 526. The components depicted in FIG. 5 are physical examples of the block components depicted in FIG. 4. These components may form an aircraft wing structure. The composite in the components may be, for example, without limitation, graphite, Kevlar, fiberglass reinforced or metallic reinforced, or a combination thereof. If lightning strike conductive materials are used, skin 524 may include plies of metal. Lightning strike conduction may be provided by a ply of foil, screening, or mesh. Resin may be used as a binder of the composite material plies in skin 524.

In these examples, skin 524 may be a composite skin. Of course, other materials other than composite, such as homogenous materials may be employed in skin 524. For example, without limitation, skin 524 may be formed using aluminum or any other suitable material. These components may form a structural assembly within airframe 318 of aircraft 302 in FIG. 3.

Figure 6:
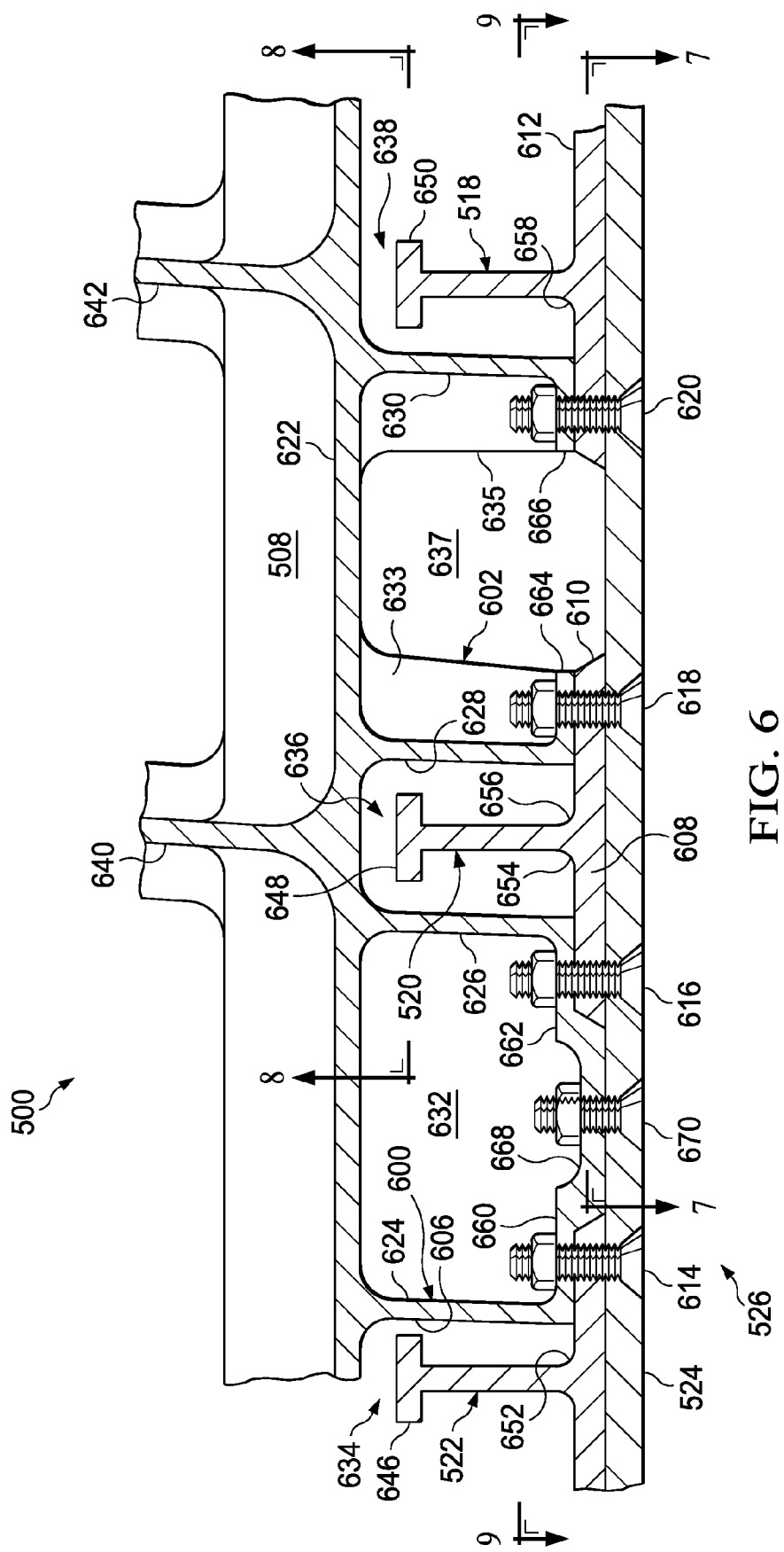
FIG. 6 is an illustration of a sectional view of a portion of wing in accordance with an advantageous embodiment.

With reference next to FIG. 6, an illustration of a section cut view of a portion of wing 500 is depicted in accordance with an advantageous embodiment. In this example, the depicted view is a more detailed illustration of section 528 in FIG. 5. In wing skin panel 526, stringer skin flanges 608, 610, and 612 may be attached to shear ties 600 and 602. This attachment may be made using fasteners 614, 616, 618, and 620, respectively. These fasteners may take various forms, such as, for example, without limitation, bolts, combination tension/compression load path and disbond arrestment fasteners, or any other suitable fastener systems or mechanisms. These fasteners also may attach and/or fasten skin 524 to rib 508.

In these advantageous embodiments, a shear tie may be any structure located below chord 622 in rib 508. As a more specific example, a shear tie may be any structure below chord 622 in rib 508 that may be used to connect skin panel 526 to rib 508. In these examples, shear ties 600 and 602 may be integral to rib 508, as depicted. In other advantageous embodiments, shear ties 600 and 602 may be structures that may be fastened and/or bonded to rib 510. If fasteners are used with this alternative embodiment, these fasteners are in addition to those that may be used to attach shear ties 600 and 602 to skin panel 526. In either described embodiment, all of rib 510 is attached to skin panel 526 through shear ties 600 and 602.

As depicted, shear tie 600 may include gusset 624 and gusset 626; shear tie 602 may include gusset 628 and gusset 630. Further, shear tie 600 may include web 632, which may be a substantially planer member. In this example, shear tie 602 may include section 633 and section 635 with space 637. Section 633 and section 635 are planer sections similar to web 632.

In the depicted examples, space 637, section 633, and section 635 may be formed to provide an open area through which components such as, for example, without limitation, cables, wires, and tubes may pass through space 637 within a wing in which rib 508 is located.

Skin panel 526 may have a shape that forms an inner surface profile with its attachment to rib 508. Ribs may be stiffened from a lower wing surface to an upper wing surface. This stiffening may occur through the arrangement of rib 508, shear ties 600 and 602, and skin panel 526.

With this type of arrangement, a tensile pull off load and/or crushing load may occur with respect to forces applied to skin panel 526. This type of load may tend to pull skin panel 526 away from rib 508 and/or crush or compress skin panel 526 into rib 508. In particular, the attachment of stringers 518, 520, and 522 to shear ties 600 and 602 for rib 508 form a configuration through which tensile pull off loads and/or crushing loads may be conveyed.

To react to this tensile pull off and/or crushing load, gussets 624, 626, 628, and 630 may be structural members extending downward from rib 508. These gussets may be formed around spaces 634, 636, and 638. These spaces may be formed within the shear ties and/or may be formed by cutting away portions of the shear tie. These gussets may help transfer loads from skin panel attachment into other areas of rib 508, such as, for example, without limitation, web 632, stiffener 640, and stiffener 642.

The configuration of gussets 624, 626, 628, and 630 in forming spaces 634, 636, and 638 may provide space for stringers 518, 520, and 522 to pass through rib 508. Also, gussets 624, 626, 628, and 630 act in concert with stiffeners 640 and 642 in rib 508 and may provide structural integrity for rib 508 in addition to reacting to tensile pull off and/or crushing loads. In the illustrative embodiment, ribs, such as rib 508, may be machined to provide gussets and spaces, such as gussets 624, 626, 628, and 630 with spaces 634, 636, and 638. In other advantageous embodiments, these structures may be formed using other methods, such as, for example, without limitation, composite layup, stamping, casting, and/or forging.

As illustrated, skin flanges 608, 610, and 612 are wide as compared to stringer free flanges 646, 648, and 650. In these examples, stringer free flanges 646, 648, and 650 may be shaped and/or tabbed in a manner such that the size of spaces 634, 636, and 638 may be minimized. Further, this configuration may allow gussets 624, 626, 628, and 630 to sit or be located more closely to stringer radius 652, 654, 656 and 628. With this type of configuration, members, such as flanges 660, 662, 664, and 666 may extend from gussets 624, 626, 628, and 630, respectively. These flanges may be attached and/or fastened to stringer skin flanges 600, 602, and 604 through fasteners 614, 616, 618, and 620. Further, this attachment also fastens and/or attaches skin 524 to stringer skin flanges 608, 610, and 612.

In this example, panel footer 668 may be a section between flanges for gussets, such as flange 660 and flange 662. Panel footer 668 may also be referred to as a rib shear tie footer. Panel footer 668 provides an additional point of attachment for skin 524 to shear tie 600, in these examples. Panel footer 668 may be attached to skin 524 with fastener 670 or any other suitable attachment mechanism.

Figure 1:
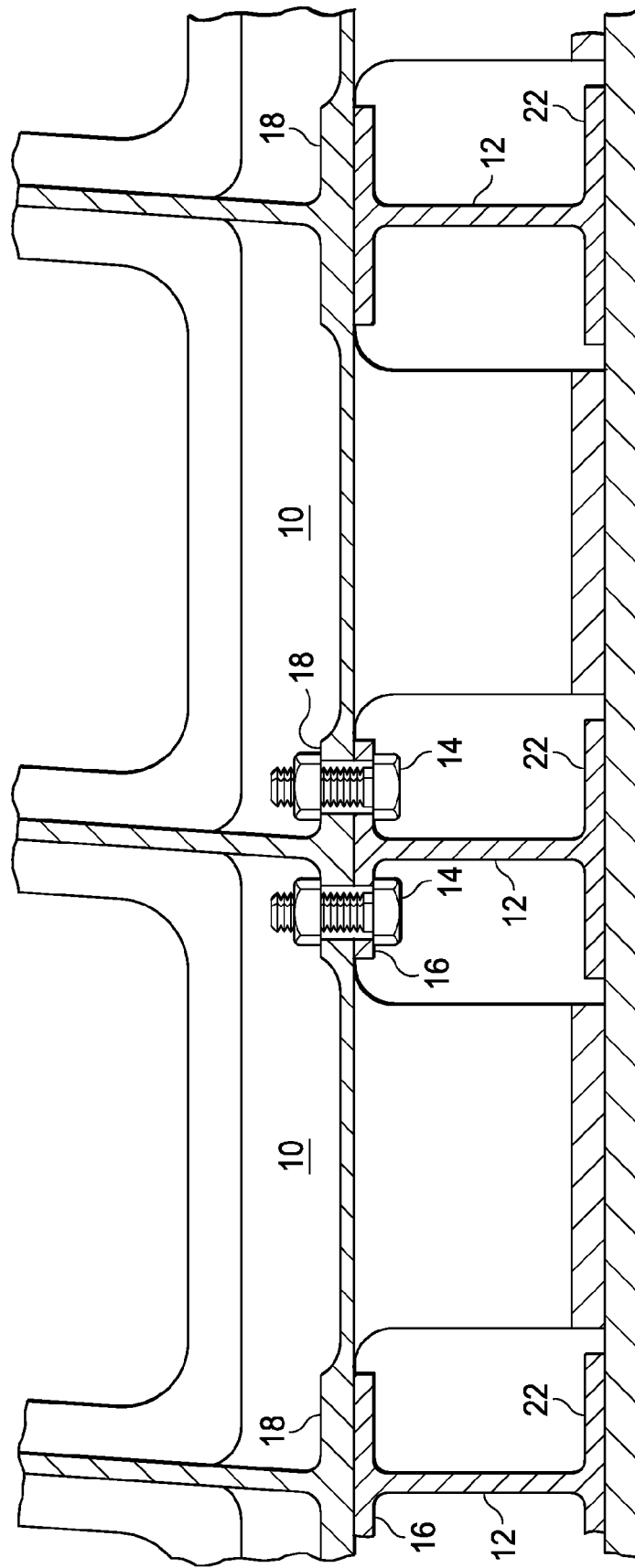
FIG. 1 is an illustration of an elevation view of a known wing structure showing rib and wing panel attachment elements in which an advantageous embodiment may be implemented.

This type of configuration may reduce the load placed upon stringer radius 652, 654, 656, and 658. This type of configuration is in contrast to currently employed configurations in which a stringer free flange may be directly attached to the rib. With this type of configuration, as shown in FIG. 1, more torque tension and crushing forces, bending, shear, fore and aft forces, and/or crushing forces may be placed upon the stringer radius. This type of configuration is less desirable for reacting to these types of forces than that illustrated in the different advantageous embodiments.

Turning next to FIG. 7, an illustration of a cross-sectional plan view of a stringer and rib structure configuration at the elevation of stringer skin flanges is depicted in accordance with an advantageous embodiment. In this example, the view of rib 508, stringer 518, and stringer 520 are taken from lines 7-7 in FIG. 6.

As can be seen from this illustration, stringer skin flange 608 includes tab outs 700 and 702. Stringer skin flange 612 includes tab outs 704 and 706. Tab outs 700 and 702 may be connected to flanges, such as flanges 662 and 664 in FIG. 6.

With reference next to FIG. 8, an illustration of a sectional view of a stringer and rib structure at a stringer through flange is depicted in accordance with an advantageous embodiment. In this example, the illustration of stringer free flanges 648 and 650 are shown from a sectional view taken along lines 8-8 in FIG. 6. As can be seen in this view, stringer free flange 648 may be narrower at section 800 and widen out outside of section 800. The width of section 800 may be designed to allow for space 634 to be narrow enough to allow gussets 626 and 628 to be closer to each other and to stringer 540 (not shown).

Figure 9:
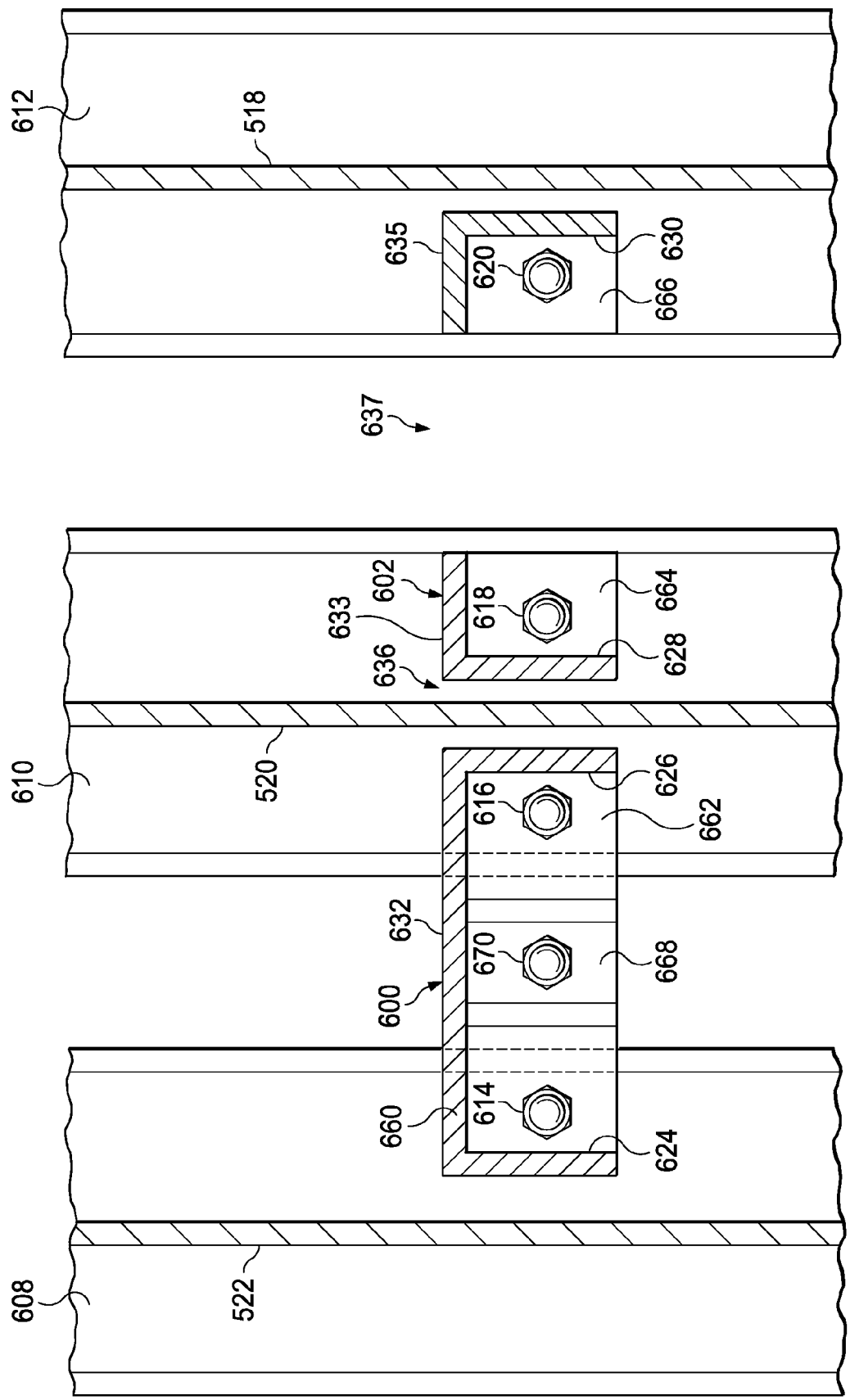
FIG. 9 is an illustration of a cross-sectional plan view of a stringer and rib structure configuration in accordance with an advantageous embodiment.

With reference next to FIG. 9, an illustration of a cross-sectional plan view of a stringer and rib structure configuration is depicted in accordance with an advantageous embodiment. In this example, the view of the different components is taken from lines 9-9 in FIG. 6.

Thus, as can be seen from the different views and other illustrations, the configuration of shear ties 600 and 602 with rib 508 and the connections and/or attachments to stringers 518, 520, and 522 may provide for increased column stability. In these examples, tab outs 700 and 702 may aid in providing column stability as described below. In these examples, the column may include elements in a load path, such as load path 416 in FIG. 4. These elements may include a stringer, such as stringer 412, tab outs 700 and 702 over flanges 662 and 664.

This type of arrangement with tab outs 700 and 702 may allow for gussets 626 and 628 to be more closely spaced with respect to stiffener 640. As a result, these elements may provide a more stable structure for column stability. This type of stability may provide resistance for upper and lower panels as a wing bends. By placing components more closely together with respect to a vertical spacing, increased resistance and/or ability to handle fore and aft tension and/or crushing forces may occur.

As can be seen, in these different illustrative embodiments, the configuration of rib 508 along with shear ties 600 and 602 may allow rib 508 to land or be placed on a stringer, such as stringer 520 in a manner that may help increase stiffness of the assembly and reduce fore and aft deflections away from the skin. In other words, the architecture of rib 508 with shear tie 602 may allow shear tie 602 to directly connect to stringer skin flange 610 of stringer 520.

This type of configuration is in contrast to the currently used configuration in which a stringer is directly connected to the rib as shown in FIG. 1. In the depicted example in FIG. 1, stringers 12 may be connected to rib chord flange 18. As can be seen, only a single structural member is present, which may be more prone to flexing.

In contrast, the different advantageous embodiments employ additional members and shear ties to provide for the structural stiffness with respect to other portions of the rib, such as chord 622 and stiffener 640. As a result, gussets, such as gussets 626 and 628 may provide additional structural stability in a load path such as load path 416 in FIG. 4, when loading passes through these components in relation to other components, such as chord 622 and stiffener 640.

In this manner, skin panel 526 may be well supported at rib 508. With stringer free flanges being tabbed out or narrower at section 800, a distance between structural elements in rib 508 may be reduced in which stringer 520 to shear tie 600 and shear tie 602 attachment may be possible to increase column stability.

In these examples, inter-rib flange portions 802 and 804 in stringer 520 and inter-rib flange portions 806 and 808 in stringer 518 may be tailored to enhance strength in a manner that increases desired structural stability. Additionally, the tailoring also may provide an ability to reduce weight of designs incorporating different advantageous embodiments. In these examples, the tailoring may include the reduction in a width of a stringer free flange, such as stringer free flange 648 at section 800. This tailoring of the width of stringer free flanges 648 and 650 as depicted in FIG. 8 may allow for gussets 626 and 628 to be placed closer to each other and/or with respect to stiffener 640 and chord 622. The different advantageous embodiments provide a configuration for a wing substructure in which structural components in a shear tie may sit on a stringer and skin.

Figure 10:
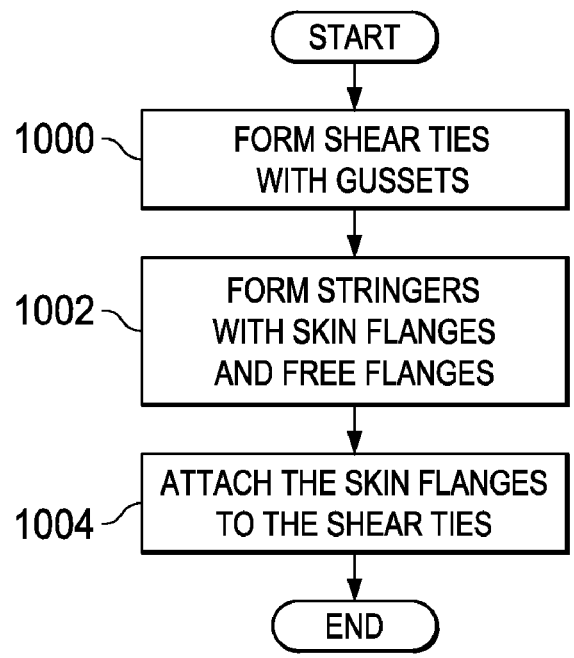
FIG. 10 is a flowchart of a process for assembling a wing in accordance with an advantageous embodiment.

Turning now to FIG. 10, a flowchart of a process for assembling a wing is depicted in accordance with an advantageous embodiment.

The process begins by forming shear ties with gussets (operation 1000). In these examples, the gussets may be structural components that may be aligned with other structural components in the rib to provide for increased structural stability for a load path passing through the gussets and other structural components within the rib. The gussets may be aligned around and/or closely to a structural component, such as a stiffener in the rib. This type of alignment may provide for increased column stability as well as for resistance against fore and aft deflections. In these examples, the shear ties may be formed integrally as part of the rib or may be attached and/or bonded using various mechanisms and/or fastening systems. The process forms stringers with skin flanges and free flanges (operation 1002).

The skin flanges are attached to the shear ties (operation 1004), with the process terminating thereafter. In these examples, the skin flanges may be attached to flanges extending from and/or associated with the gussets. The overlap or placement of the shear ties onto the stringer skin flanges may allow for more structural stability in the load path through the gussets. This type of stability may be accomplished by reducing the space between the gussets. Further, this type of configuration may allow for the skin and the stringer to be attached to the shear tie. Additionally, other portions of the shear tie may be connected directly to the skin on the skin panel.

Figure 11:
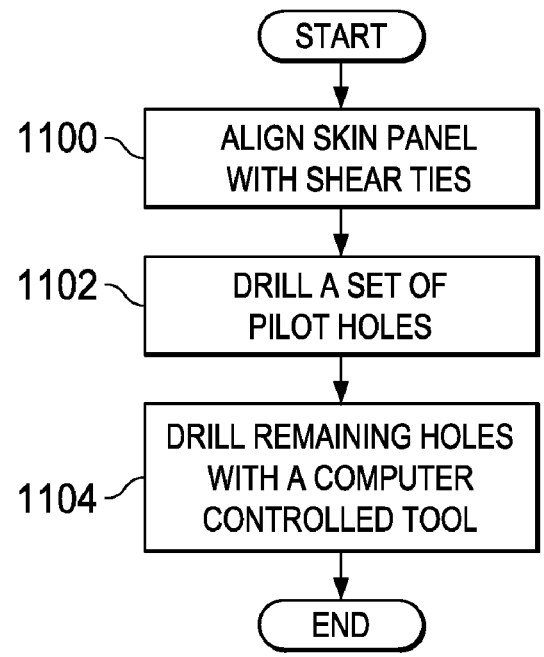
FIG. 11 is a flowchart of a process for installing the skin panel in accordance with an advantageous embodiment.

With reference now to FIG. 11, a flowchart of a process for installing a skin panel is depicted in accordance with an advantageous embodiment. This process may allow for drilling and/or fastener installation from the exterior.

The process begins by aligning the skin panel with the shear ties (operation 1100). This alignment may involve placing the skin panel in place with respect to the other portion of the wing. Thereafter, a set of pilot holes may be drilled (operation 1102). One or more holes may be created for the set of pilot holes. These pilot holes may be drilled manually or through user selection of a drilling location to identify appropriate reference marks for drilling the remaining holes to attach the skin panel to the wing.

After the set of pilot holes have been drilled, the process may drill the remaining holes with a computer controlled tool (operation 1104), with the process terminating thereafter. A skilled person in the art may recognize other means of controlling the drill tool. In operation 1104, the initial reference holes provide a reference for the computer controlled tool to drill the remaining holes. The identification of the location of the remaining holes may be made through data or models for the structure. As a result, once the initial pilot holes are correctly identified, the drilling of the remaining holes may be performed using the computer controlled tool in a manner that avoids having to drill holes from the interior of the wing. Of course, any tool that forms and/or drills holes may be used. For example, without limitation, a conventional drill jig pinned to pilot holes also may be used.

Thus, the different advantageous embodiments provide a method and apparatus for an aircraft wing structure. In one advantageous embodiment, the aircraft wing structure may have a rib, a plurality of stringers, and a set of shear ties. The plurality of stringers may have skin flanges at ends of the plurality of stringers capable of being fastened to the skin for the aircraft wing structure. The set of shear ties may extend from the rib and have a set of elongate members in which the set of elongate members are attached to the plurality of stringers. A skilled person in the art may adapt these teachings to other suitable aircraft structures such as, without limitation, fuselage, stabilizers, control surfaces, and doors.

These illustrated embodiments, may provide improved structural integrity in an aircraft wing structures as compared to current configurations in which stringers are directly attached to a rib without relying on a shear tie in the rib. The configurations depicted in the examples also may reduce and/or eliminate concerns with forces applied to a radius of a stringer.

Further, in some advantageous embodiments, assembly of the aircraft wing structure may be made easier because holes for attaching a skin panel to a rib may be made without drilling from outside of the wing structure after the skin panel has been put into place. The location of the fasteners for attaching the skin panel to the shear tie, in the different advantageous embodiments, may provide this feature.

Additionally, with some or all of the advantageous embodiments, weight savings, reduced manufacturing costs, and speedier fabrication may occur. Also, the manner in which components may be arranged in the wing may reduce the number of fasteners drilled and installed inside the wing. An additional benefit may include a reduced chance of foreign objects and debris being present in the wing.

The description of the different advantageous embodiments have been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft structure comprising:
   a rib;
   a plurality of stringers capable of being fastened to a skin of the aircraft structure, each stringer of the plurality of stringers having skin flanges at an end thereof; and
   a set of shear ties extending from the rib and capable of being fastened to the plurality of stringers and to the skin of the aircraft structure for attaching the rib to the skin of the aircraft structure, the set of shear ties comprising:

a set of substantially planar web portions;
first and second gussets extending from opposed side edges of each substantially planar web portion of the set of substantially planar web portions; and
a gusset flange extending from an end of each of the first and second gussets, each gusset flange capable of being attached to a skin flange of a stringer of the plurality of stringers and to the skin of the aircraft structure for fastening the set of shear ties to the plurality of stringers and to the skin of the aircraft structure; and
a first plurality of fasteners extending through the gusset flanges and through the skin flanges for fastening the set of shear ties to the plurality of stringers and to the skin of the aircraft structure for attaching the rib to the skin of the aircraft structure, wherein each of the first and second gussets of the set of shear ties are spaced apart from each of the plurality of stringers.

2. The aircraft structure of claim 1, further comprising:
a set of rib shear tie footers each extending between a gusset flange of each of adjacent substantially planar web portions of the set of substantially planar web portions and between a skin flange of each of adjacent stringers of the plurality of stringers; and
a second plurality of fasteners for fastening the set of rib shear tie footers to the skin of the aircraft structure.

3. The aircraft structure of claim 1, wherein the set of shear ties are integral with the rib.

4. The aircraft structure of claim 1, wherein the first gusset and the second gusset extend from the rib and act in concert with a stiffener in the rib at an end of the first and second gusset that is opposite to the gusset flanges to form a load path from the fib to the skin of the aircraft structure.

5. The aircraft structure of claim 4, wherein a spacing of the first and second gussets with respect to the stiffener in the rib reduces fore and aft deflection in response to forces on the aircraft structure.

6. The aircraft structure of claim 1, wherein the aircraft structure is selected from one of a wing, a stabilizer, a control surface, a fuselage, and a door.

7. The aircraft structure of claim 1, wherein the skin flanges of each of the plurality of stringers comprise tab outs, and wherein the a first plurality of fasteners extend through the tab outs of the skin flanges for fastening the set of shear ties to the plurality of stringers and to the skin of the aircraft structure.

8. The aircraft structure of claim 1, wherein the first plurality of fasteners also extend through the skin of the aircraft structure.

9. A method for manufacturing an aircraft structure, the method comprising:
providing a plurality of ribs;
providing a plurality of stringers, each stringer of the plurality of stringers having skin flanges at an end thereof;
providing a set of shear ties extending from the plurality of ribs, the set of shear ties having a set of substantially planar web portions, first and second gussets extending from opposed side edges of each substantially planar web portion of the set of substantially planar web portions, and a gusset flange extending from an end of each of the first and second gussets; and
extending a first plurality of fasteners through the gusset flanges of the set of shear ties and through the skin flanges of the plurality of stringers for fastening the set of shear ties to the plurality of stringers and to a skin for the aircraft structure for attaching the plurality of ribs to the skin of the aircraft structure wherein each of the first and second gussets of the set of shear ties are spaced apart from each of the plurality of stringers.

10. The method of claim 9, wherein the aircraft structure further comprises a set of rib shear tie footers each extending between a gusset flange of each of adjacent substantially planar web portions of the set of substantially planar web portions and between a skin flange of each of adjacent stringers of the plurality of stringers, the method further comprising:
extending a second plurality of fasteners through the rib shear tie footers to fasten the rib sheer tie footers to the skin of the aircraft structure.

11. The method of claim 9, wherein the providing a set of shear ties extending from the plurality of ribs further comprises:
forming the set of shear ties integrally as part of the plurality of ribs.

12. The method of claim 9, wherein the extending step comprises:
aligning the plurality of stringers and the skin of the aircraft structure;
drilling a set of pilot holes from an exterior side of the plurality of stringers and the skin of the aircraft structure; and
drilling remaining holes using a computer controlled tool.

13. The method of claim 9, wherein the skin flanges of each of the plurality of stringers comprise tab outs, and wherein the extending step comprises extending the first plurality of fasteners through the tab outs of the skin flanges for fastening the set of shear ties to the plurality of stringers and to the skin of the aircraft structure.

14. The method of claim 9, wherein the extending step further comprises also extending the first plurality of fasteners through the skin of the aircraft structure.

* * * * *